(12) United States Patent
Dowd et al.

(10) Patent No.: US 12,444,797 B1
(45) Date of Patent: Oct. 14, 2025

(54) BATTERY RETAINING DEVICE

(71) Applicant: SimpliSafe, Inc., Boston, MA (US)

(72) Inventors: Kristin Dowd, Bolton, MA (US);
Kaleb Brown, Boston, MA (US);
James Heywood, Charlton, MA (US);
Dean Goodale, Medway, MA (US);
Yu-Hsiang Chiu, New Taipei (TW);
Shan-Chun Yu, New Taipei (TW);
Chih-Chien Hu, New Taipei (TW)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/048,027

(22) Filed: Feb. 7, 2025

Related U.S. Application Data

(60) Provisional application No. 63/689,196, filed on Aug. 30, 2024.

(51) Int. Cl.
*H01M 50/202* (2021.01)
*H01M 50/109* (2021.01)
*H01M 50/262* (2021.01)
*H01M 50/271* (2021.01)

(52) U.S. Cl.
CPC ....... *H01M 50/202* (2021.01); *H01M 50/262* (2021.01); *H01M 50/271* (2021.01); *H01M 50/109* (2021.01)

(58) Field of Classification Search
CPC . H01M 50/262; H01M 50/109; H01M 50/216
See application file for complete search history.

(56) References Cited

U.S. PATENT DOCUMENTS

| 4,692,846 | A | 9/1987 | Johnson |
| 5,149,604 | A * | 9/1992 | Nakanishi ........... H01M 50/216 |
| | | | 429/97 |
| 5,601,941 | A | 2/1997 | Tuttle |
| 6,240,631 | B1 | 6/2001 | Chow |
| 6,669,504 | B2 | 12/2003 | Wu |
| 6,911,279 | B2 | 6/2005 | Po et al. |

(Continued)

FOREIGN PATENT DOCUMENTS

| EP | 2405407 A2 * | 1/2012 | ......... G07C 9/00944 |
| GB | 2143988 B | 4/1987 | |

(Continued)

OTHER PUBLICATIONS

SwitchBot Remote, Model: W0301700; puchased from www.Amazon.com on Jun. 22, 2023.

(Continued)

*Primary Examiner* — Maria Laios
(74) *Attorney, Agent, or Firm* — Stevens & Showalter LLP

(57) ABSTRACT

A device includes a base and a depressible cover. The base defines a battery opening in which to receive a battery having the form factor of a coin-cell. The base includes a retainer located proximate to the battery opening. The depressible cover is disposed in the battery opening and is secured in place against the retainer to prevent removal of the battery from the base while the cover is coupled to the base. The cover includes a detent and a body portion, wherein the cover is releasably secured to the base upon engagement of the body portion with the retainer and engagement of the detent with a shoulder of the base.

25 Claims, 15 Drawing Sheets

(56) References Cited

U.S. PATENT DOCUMENTS

| | | | |
|---|---|---|---|
| 7,371,108 | B2 | 5/2008 | Sun |
| 7,662,507 | B2 | 2/2010 | Schwendinger et al. |
| 7,981,535 | B2 | 7/2011 | Scott et al. |
| 9,388,998 | B2 | 7/2016 | Khoury et al. |
| 10,206,447 | B2 | 2/2019 | Egeland et al. |
| 10,270,070 | B2 * | 4/2019 | Cadio ................. H01M 50/216 |
| 10,333,116 | B2 | 6/2019 | Blaha et al. |
| 10,637,011 | B2 | 4/2020 | Pozin et al. |
| 11,018,394 | B2 | 5/2021 | Blaha et al. |
| 11,502,367 | B2 | 11/2022 | Fukuda et al. |
| 2004/0137786 | A1 | 7/2004 | Yu |
| 2008/0268701 | A1 | 10/2008 | Yuan et al. |
| 2014/0128710 | A1 * | 5/2014 | Nakamura .......... H01M 50/216 |
| | | | 429/100 |
| 2017/0367426 | A1 | 12/2017 | Egeland et al. |
| 2019/0267586 | A1 | 8/2019 | Conn et al. |
| 2023/0041934 | A1 | 2/2023 | Maffazioli |

FOREIGN PATENT DOCUMENTS

| | | | | |
|---|---|---|---|---|
| GB | 2255853 B | | 1/1995 | |
| GB | 2515835 B | | 4/2017 | |
| WO | WO2015013933 | * | 2/2015 | |
| WO | WO-2015013933 A1 | * | 2/2015 | ........... G01C 22/006 |

OTHER PUBLICATIONS

Amazon Basics Computer Mouse, Model: G6B-BK; puchased from www.Amazon.com on May 31, 2023.

Dowd, Kristin; Related U.S. Continuation Application No. 19/308,740 entitled "Battery Retaining Device"; filed Aug. 25, 2025; United States Patent and Trademark Office; Alexandria, Virginia.

* cited by examiner

BATTERY RETAINING DEVICE

CROSS-REFERENCE TO RELATED APPLICATION

This application claims the benefit of U.S. Provisional Patent Application Ser. No. 63/689,196, filed Aug. 30, 2024, entitled "BATTERY RETAINING DEVICE," the entire disclosure of which is hereby incorporated by reference herein.

BACKGROUND

One type of existing technology for removing a coin cell battery from an electrical equipment utilizes a coin (e.g., a quarter, nickel, etc.), which is placed into a slot formed in a battery cover and assists a user in turning the cover a specified number of degrees to release the cover, allowing the battery to be accessed and removed. Other types of products include a coin cell battery that is permanently fixed to the product, not allowing removal of the battery.

SUMMARY OF THE DISCLOSURE

In one aspect of the present disclosure, a device comprises a base and a depressible cover. The base defines a battery opening in which to receive a battery having the form factor of a coin-cell. The base includes a retainer located proximate to the battery opening. The depressible cover is disposed in the battery opening and is secured in place against the retainer to prevent removal of the battery from the base while the cover is coupled to the base. The cover includes a detent and a body portion, wherein the cover is releasably secured to the base upon engagement of the body portion with the retainer and engagement of the detent with a shoulder of the base.

The body portion of the depressible cover may comprise a main section, a rim, and an opening extending between the main section and the rim. The rim may be coupled to the main section at spaced apart locations near ends of the opening of the cover. When a force is applied to the depressible cover, the cover and the battery may be displaced in a downward direction.

During installation of the depressible cover onto the base, the cover may flex to allow the detent to pass by the shoulder while the body portion of the cover is restrained by the retainer.

In another aspect of the present disclosure, a device comprises a base and a cover. The base defines a battery opening through which a battery is adapted to pass to be received in the device, and comprises a shoulder located proximate to the battery opening, and a retainer located proximate to the battery opening opposite the shoulder. The cover is releasably fastened to the base to prevent the battery from exiting through the battery opening while the cover is coupled to the base. The cover comprises a body portion including a main section and a rim, and a fastener section extending from the body portion and including a detent. While the device is in an assembled state, the detent engages the shoulder while the rim engages the retainer.

The base may include a housing and a battery plate, the battery plate defining the battery opening and including the shoulder and the retainer. The battery plate may be integral with the housing of the base, or the battery plate may be formed separately from and attached to the housing of the base.

At least one of the cover or the base may define a slot for receiving a tool to apply a force against the cover to release the detent from engagement with the shoulder. According to one aspect, the slot may be defined in the cover in or near the fastener section such that when the tool is inserted into the slot and applies the force onto the cover, the cover flexes to allow the detent to pass by the shoulder while the rim of the cover is restrained by the retainer. The body portion of the cover may further include an opening extending between the main section and the rim, and the rim of the cover may be coupled to the main section at spaced apart locations near ends of the opening in the cover, such that when the force is applied to the cover by the tool, the cover flexes at or near the locations where the rim is coupled to the main section.

The detent may comprise at least one of a hook, a spring-biased ball plunger, or a latch.

The retainer of the base may comprise a retaining extension and the rim of the cover may comprise a retainment recess for receiving the retaining extension.

In a further aspect of the present disclosure, a device comprises a base and a flexible cover. The base defines a battery opening through which a battery is adapted to pass to be received in the device, and comprises a shoulder located proximate to the battery opening. The cover is releasably fastened to the base to prevent the battery from exiting through the battery opening while the cover is coupled to the base, and comprises a body portion and a fastener section extending from the body portion and including a detent. While the flexible cover is installed within the base, the detent engages the shoulder. The detent releases from the shoulder in response to a force being applied to the flexible cover causing the flexible cover to flex so as to disengage the detent from the shoulder.

At least one of the cover or the base may define a slot for receiving a tool to apply the force against the flexible cover to release the detent from engagement with the shoulder. According to one aspect, the slot may be defined in the cover in or near the fastener section such that when the tool is inserted into the slot and applies the force onto the flexible cover, the flexible cover flexes to release the detent from the shoulder. The body portion of the flexible cover may comprise a main section, a rim, and an opening extending between the main section and the rim, and the rim may be coupled to the main section at spaced apart locations near ends of the opening of the flexible cover, such that when the force is applied to the flexible cover by the tool, the cover flexes at or near the locations where the rim is coupled to the main section.

The detent may comprise at least one of a hook, a spring-biased ball plunger, or a latch.

The base may further comprise a retainer located proximate to the battery opening opposite the shoulder and, while the flexible cover is installed within the base, the body portion of the cover may engage the retainer. The retainer of the base may comprise a retaining extension and the body portion of the cover may comprise a retainment recess for receiving the retaining extension.

In an additional aspect of the present disclosure, a process is provided for installing a battery in a device. The device is provided, which comprises a base and a cover. The base comprises a battery opening, a shoulder located proximate to the battery opening, and a retainer located proximate to the battery opening opposite the shoulder. The cover comprises a body portion and a detent extending from the body portion. A battery is inserted through the battery opening in the base. The body portion of the cover is positioned between the battery and the retainer. The cover is secured onto the base by engagement of the detent with the shoulder of the base.

The cover may be caused to flex while securing the cover onto the base by engagement of the detent with the shoulder of the base.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale. Aspects of the present disclosure are described with reference to the following drawings in which numerals reference like elements, and in which.

DETAILED DESCRIPTION

Figure 1:
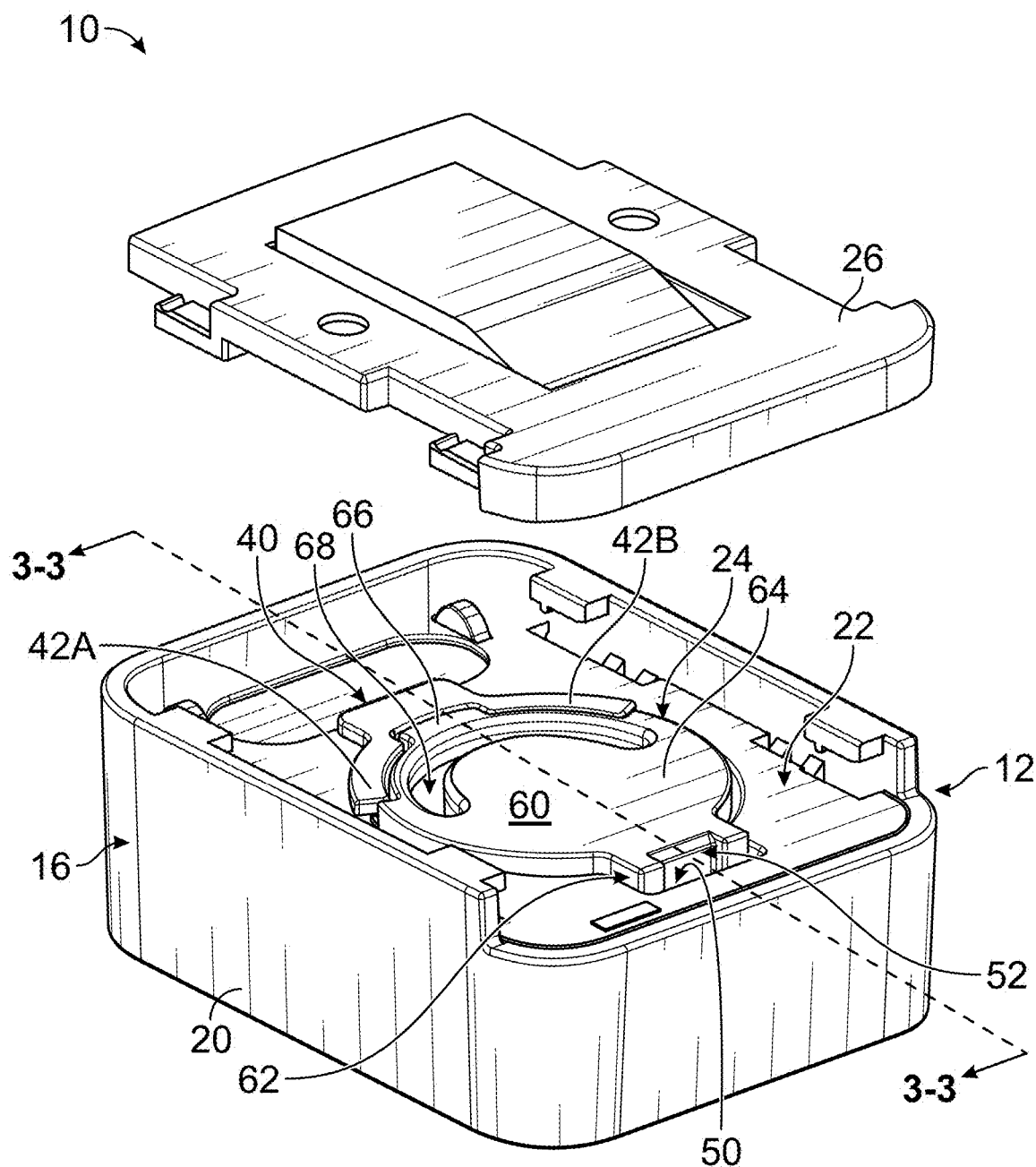
FIG. 1 is a perspective view of a device in accordance with the present disclosure.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

One type of battery used to power electronic equipment has the form factor of a coin cell, i.e., a coin cell battery. In these types of equipment, the coin cell battery may be removable from the equipment, allowing the battery to be replaced when the power contained therein is depleted. One existing method for removing a coin cell battery from an electronic equipment utilizes a coin (e.g., a quarter, nickel, etc.), which is placed into a slot formed in a battery cover and assists a user in turning the cover a specified number of degrees to release the cover, allowing the battery to be accessed and removed. One common problem associated with such existing equipment is that the battery retaining devices may be difficult to use and or may become jammed, making access to the battery difficult.

The present disclosure provides alternate solution(s) for installing a battery, such as a coin cell battery in an electronic equipment and for accessing the battery for removal from the equipment. The battery retaining devices according to the present disclosure are believed to provide access to batteries in a more reliable manner.

With reference to the drawings, FIGS. 1-4C depict an electronic equipment 10 (hereinafter "equipment 10") according to an exemplary embodiment. The illustrated equipment 10 comprises a device 12, and more specifically a battery retaining device that is used to secure a battery 14 in the equipment 10, wherein the battery 14 powers the equipment 10 for use thereof to perform one or more functions. The battery 14 may be a coin cell battery, i.e., having a generally circular shape in the form factor of a coin cell.

The device 12 depicted in FIGS. 1-4C comprises a base 16, which defines an internal chamber 18 (see FIGS. 3A-3C) that houses working components of the equipment 10, which working components vary based on the type of equipment and will not be discussed in detail herein. According to the embodiment of FIGS. 1-4C, the base 16 comprises a housing 20 and a battery plate 22 that is separately formed from and is attached to the housing 20 via any suitable attachment means, such as, for example, gluing, press fitting, clipping, latching, etc. The device 12 further comprises a cover 24 that is releasably fastened to the base 16 to prevent removal of the battery 14 from the base 16 while the cover 24 is coupled to the base 16.

Figure 2:
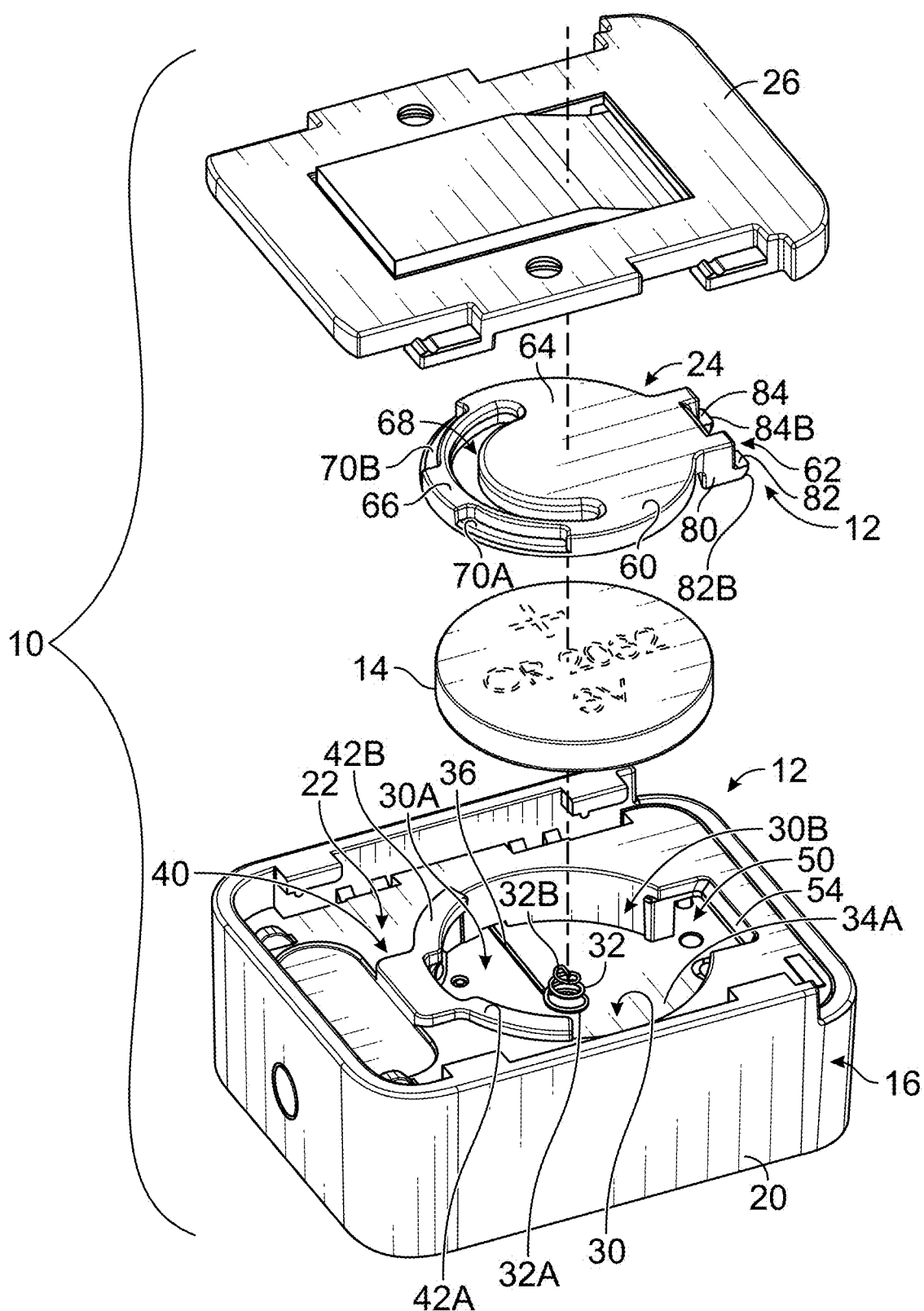
FIG. 2 is an exploded view of the device of FIG. 1.

As shown in FIGS. 1 and 2, the equipment 10 further comprises a cap 26 that is removably coupled to the base 16 using any suitable non-permanent attachment means, such as, for example, press fitting, clipping, latching, etc. The cap 26 is coupled to the base 16 while the equipment 10 is in an operational state and is removed from the base 16 during battery installation and removal processes, which will be described in detail below.

The battery plate 22 defines a battery opening 30 in which to receive the battery 14, as most clearly shown in FIG. 2. The battery opening 30 has a shape that corresponds to the shape of the battery 14, and in the embodiment shown the battery opening 30 has a generally circular shape since the battery 14 according to the present embodiment comprises a coin cell battery 14. The battery plate 22 includes features that are used to removably couple the cover 24 to the base 16 as will be described herein.

With reference still to FIG. 2, a spring 32 is provided within the battery opening 30 for providing a spring force against the battery 14 while the battery 14 is being retained within the device 12. The spring force is also provided on the battery 14 by the spring 32 during battery installation and removal processes as will be discussed herein. A backside 32A of the spring 32 is seated against and may be coupled to (e.g., by soldering) a backside 34A of a plate, which may comprise a printed circuit board 34 that is located underneath the battery plate 22 in the internal chamber 18 of the base 16. A frontside 32B of the spring 32 opposite to the backside 32A thereof contacts the negative side of the battery 14 and provides the spring force against the battery 14. The spring 32 may also provide a path for electric current between the negative side of the battery 14 and the working components of the equipment 10 through a negative contact wire 36 that is electrically coupled to the spring 32 and to the working components of the equipment 10, which may be located, for example, on a frontside 34B of the printed circuit board 34. The negative contact wire 36 may be integrally formed with the spring 32 or separately formed from and affixed to the spring 32, e.g., by soldering.

Figure 3A:
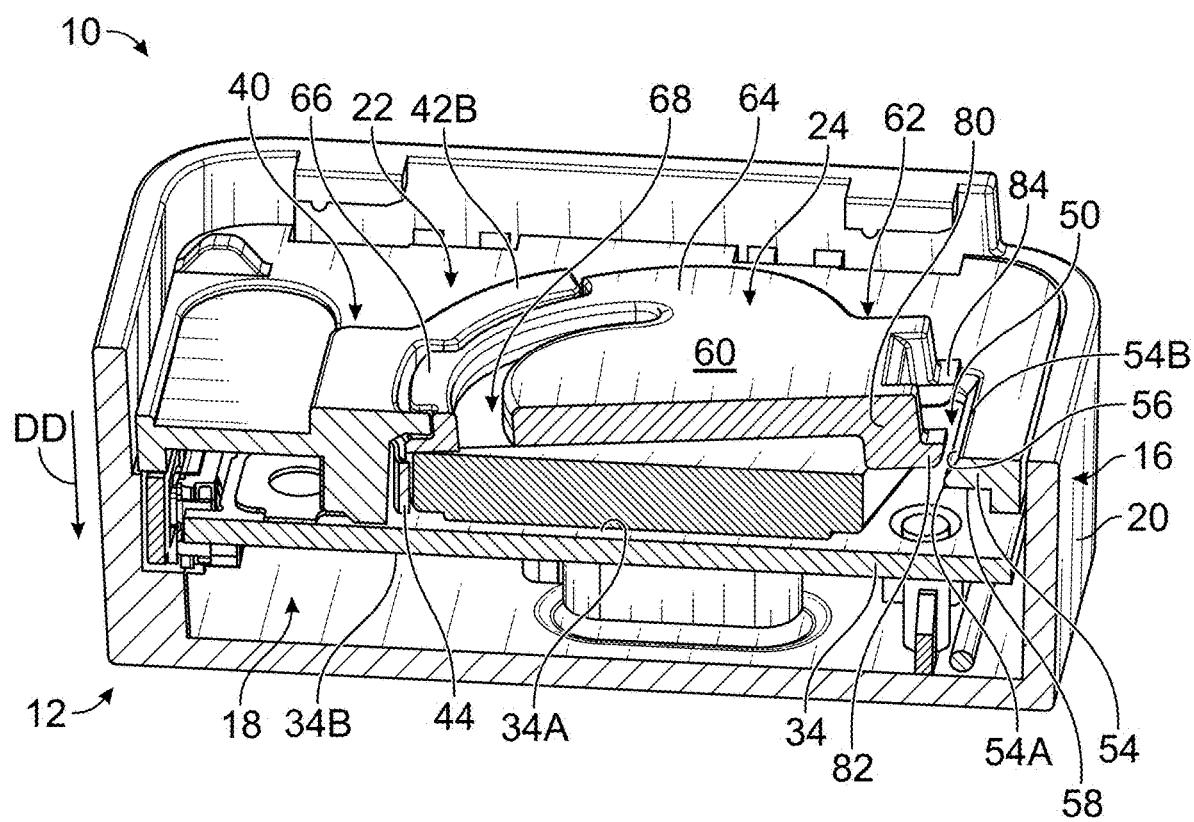
FIGS. 3A-3C are cross sectional views taken along line 3-3 in FIG. 1, illustrating a battery installation process in accordance with the present disclosure.
Figure 3B:
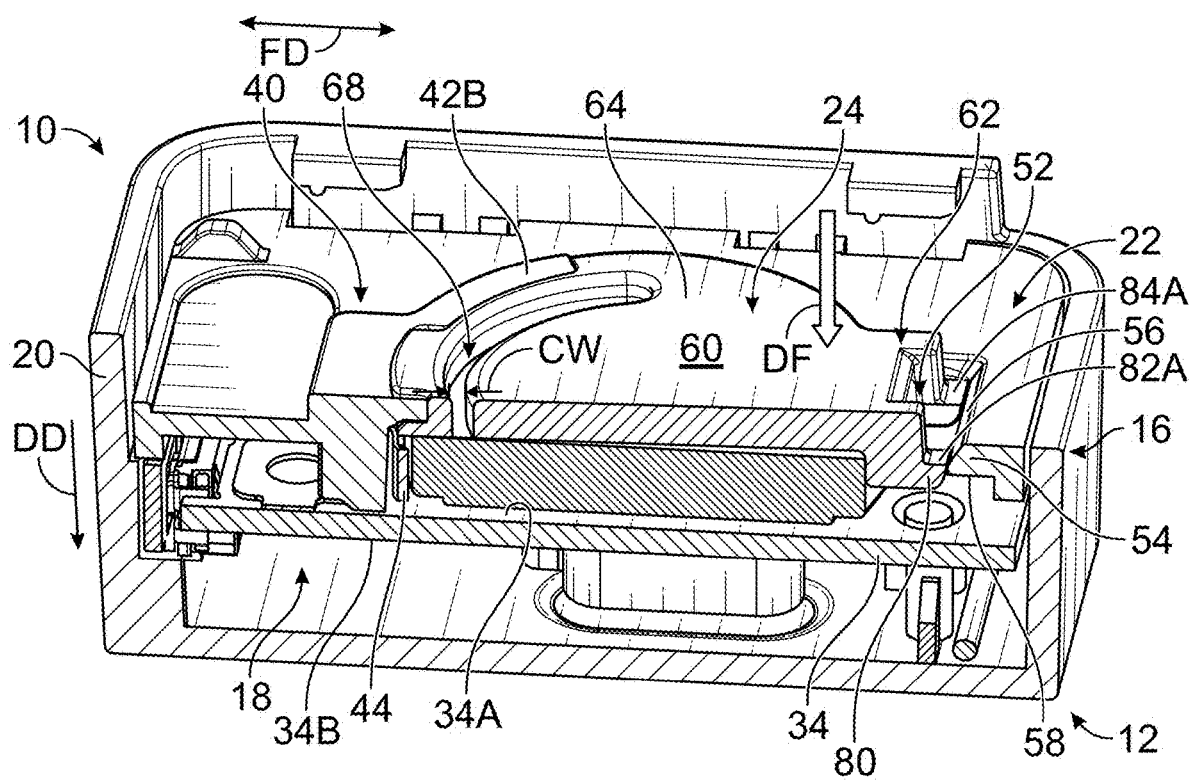
Figure 3C:
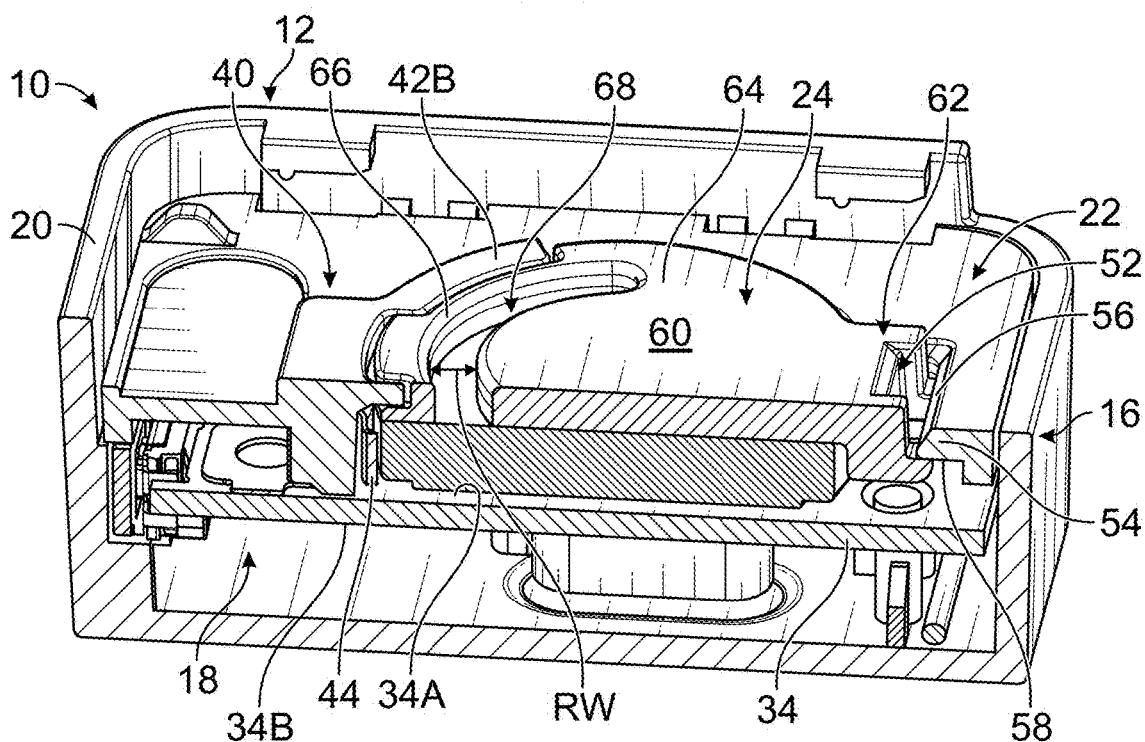

The battery plate 22 includes a retainer 40 located proximate to a first end 30A of the battery opening 30 for coupling the cover 24 to the base 16 and retaining the battery 14 in the battery opening 30. The retainer 40 may comprise at least one retaining extension that extends out over the battery opening 30 to couple the cover 24 to the base 16 and trap the battery 14 between the printed circuit board 34 and the cover 24. In the illustrated embodiment, the retainer 40 comprises first and second retaining extensions 42A, 42B. As shown in FIGS. 3A-3C, one or more electrical contacts 44 may be located within the battery opening 30 at the first end 30A thereof underneath the retaining extensions 42A, 42B for contacting the positive side of the battery 14, although it is noted that the electrical contacts 44 could be located elsewhere in contact with the positive side of the battery 14. The electrical contacts 44 provide a path for electric current between the working components of the equipment 10 and the positive side of the battery 14.

As shown most clearly in FIG. 2, the battery plate 22 further includes a cavity 50 located proximate to a second end 30B of the battery opening 30, which is opposite to the first end 30A of the battery opening 30. The cavity 50 may form an extension of the battery opening 30 at the second end 30B thereof and may at least partially define a slot 52 for receiving a tool T during a battery removal process, which will be described below.

A shoulder 54 is provided in the battery plate 22 within the cavity 50, see FIGS. 3A-3C. The shoulder 54 is located proximate to the battery opening 30 opposite the retainer 40. The shoulder 54 may have a chamfered front face 56 that faces the first end 30A of the battery opening 30. The front face 56 may be sloped in a direction toward the first end 30A of the battery opening 30 as the shoulder 54 extends in a downward direction DD (see FIGS. 3A and 3B) into the cavity 50 toward the printed circuit board 34, such that a lower edge 54A of the shoulder 54 is located closer to the first end 30A of the battery opening 30 than an upper edge 54B of the shoulder 54. A bottom face 58 of the shoulder 54 located adjacent to the lower edge 54A faces the downward direction DD.

The cover 24 of the device 12, which as noted above is provided for securing the battery 14 in the battery opening 30 of the battery plate 22, will now be described. The cover 24 is a depressible cover, being depressible in the downward direction DD during a battery installation process to secure the battery 14 in the battery opening 30.

The cover 24 includes a body portion 60 and a fastener section 62 that extends from the body portion 60. The body portion 60 has a generally circular shape that generally corresponds to the circular shape of the battery opening 30. The body portion 60 comprises a main section 64, a rim 66, and an opening 68 extending between the main section 64 and the rim 66. The rim 66 is coupled to the main section 64 at first and second spaced apart locations 66A, 66B near respective first and second ends 68A, 68B of the opening 68, as shown most clearly in FIG. 4A. The first and second locations 66A, 66B may be about midway between first and second ends 60A, 60B of the body portion 60 of the cover 24, and define flex locations for the cover 24, i.e., the cover 24 is able to flex at the first and second locations 66A, 66B during battery installation and removal processes, such that the cover 24 is a flexible cover 24.

As shown most clearly in FIGS. 2 and 3A-3C, the rim 66 of the cover 24 may include at least one retainment recess for receiving the at least one retaining extension of the battery plate 22. In the illustrated exemplary embodiment, the rim 66 includes two retainment recesses 70A, 70B (see FIG. 2) for respectively receiving the first and second retaining extensions 42A, 42B of the battery plate 22. The retainment recesses 70A, 70B and first and second retaining extensions 42A, 42B are preferably correspondingly sized and shaped to create a snug fit therebetween while the cover 24 is coupled to the base 16.

The fastener section 62 of the cover 24 extends from the body portion 60 away from the retainer 40 and into the cavity 50 of the battery plate 22. The fastener section 62 includes a detent 80 that engages the shoulder 54 of the battery plate 22 while the cover 24 is secured to the battery plate 22. In the illustrated embodiment, the detent 80 comprises a pair of hooks 82, 84 (see FIGS. 2 and 3A) that latch onto the shoulder 54. More specifically, upper surfaces 82A, 84A of the hooks 82, 84 (see FIG. 3B) engage the bottom face 58 of the shoulder 54 while the cover 24 is secured to the battery plate 22, see FIG. 3C. The hooks 82, 84 may have chamfered front faces 82B, 84B (see FIG. 2) for sliding down the chamfered front face 56 of the shoulder 54 during a battery installing process. It is noted that the detent 80 could take the form of other suitable structures, such as, for example, a spring-biased ball plunger, a latch, etc.

The fastener section 62 may at least partially define the slot 52 for receiving the tool T during the battery removal process. That is, the slot 52 may be formed in any of the following configurations: entirely within the cavity 50 of the battery plate 22; entirely within the fastener section 62 of the cover 24; or the cavity 50 and the fastener section 62 may jointly form the slot 52.

FIGS. 5-8C depict an electronic equipment 110 (hereinafter "equipment 110") including a device 112, i.e., a battery retaining device, according to another exemplary embodiment. The equipment 110 and device 112 of FIGS. 5-8C are similar to the equipment 10 and device 12 described above with reference to FIGS. 1-4C, wherein structure in the embodiment of FIGS. 5-8C that is equivalent to structure of the embodiment of FIGS. 1-4C includes the same reference number increased by 100. Only structure that is different from that of the embodiment of FIGS. 1-4C will be specifically discussed herein for FIGS. 5-8C for brevity.

According to the present embodiment, a housing 120 of the device 112 is integral with a battery plate 122 of the device 112, i.e., the battery plate 122 is built into the housing 120, as opposed to being separately formed from and attached to the housing as with the embodiment of FIGS. 1-4C.

The remaining structure of the device 112 according to this embodiment is substantially similar to that of the embodiment depicted in FIGS. 1-4C and thus will not be repeated herein.

Figures 9, 10:
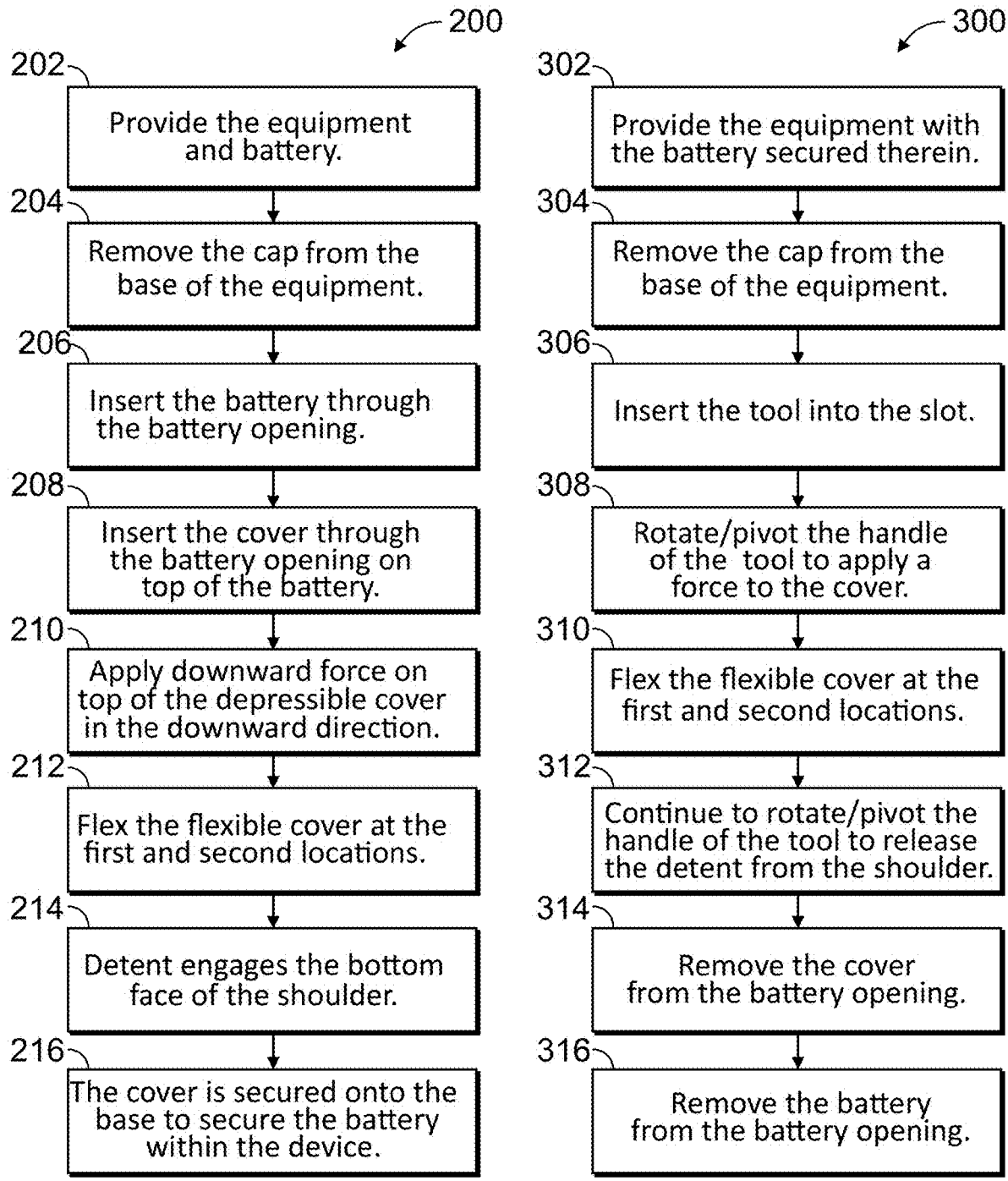
FIGS. 9 and 10 are flowcharts respectively illustrating battery installation and removal processes in accordance with the present disclosure.

With reference now to FIG. 9, a battery installation process 200 for installing a battery into a device of an electronic equipment will now be described. The process 200 will be described with reference to the exemplary equipment 10 depicted in FIGS. 3A-3C. It is understood that the process 200 could also be used to install a battery into the exemplary equipment 110 of FIGS. 7A-7C or other electronic equipment having similar battery retaining devices. The steps described herein may be performed by a user, which may be a person or machine.

At step 202, the equipment 10 (see FIGS. 1 and 2) and battery 14 are provided, and at step 204, the cap 26 is removed from the base 16.

At step 206, the battery 14 is inserted through the battery opening 30 in the base 16 of the device 12 (i.e., the battery retaining device). The battery 14 is inserted into the battery opening 30 such that the negative side of the battery 14 engages the spring 32, so that electric current can pass from the negative side of the battery 14 to the working components of the equipment 10 through the spring 32 and the negative contact wire 36 during use of the equipment 10.

At step 208, the cover 24 is inserted through the battery opening 30 on top of the battery 14. The cover 24 is inserted such that the body portion 60, and more specifically the rim 66 thereof is received under the retainer 40 of the battery plate 22. In the exemplary embodiment shown, the cover 24 is inserted through the battery opening 30 such that the two retainment recesses 70A, 70B are received under the corresponding first and second retaining extensions 42A, 42B see FIG. 3A.

With reference to FIG. 3B, at step 210, a downward force DF is applied on top of the depressible cover 24 in the downward direction DD to displace the cover 24 and the battery 14 in the downward direction DD, which downward force DF may be applied onto an area of the cover 24 toward the fastener section 62. As the downward force DF is applied, the detent 80, and more specifically the chamfered front faces 82B, 84B of the hooks 82, 84 engage and slide down the chamfered front face 56 of the shoulder 54, causing the flexible cover 24 to flex and/or pivot at the first and second locations 66A, 66B at step 212 while the body portion 60 of the cover 24 is restrained by the retainer 40. The flexing of the cover 24 causes the size of the opening 68 in the cover 24 to decrease in a first direction FD, which first direction FD is perpendicular to the downward direction DD as shown in FIG. 3B. The opening 68 defines a relaxed width RW when the cover 24 is not being flexed (see FIG. 3C), and a contracted width CW when the cover 24 is being flexed (see FIG. 3B).

The downward force DF applied to the cover 24 at step 210 is continued until the detent 80, and in the embodiment shown the hooks 82, 84 move past the chamfered front face 56 of the shoulder 54, at which point the built up force in the cover 24 caused by its flexing at the first and second locations 66A, 66B causes the hooks 82, 84 to move in the first direction FD away from the retainer 40 such that the upper surfaces 82A, 84A of the hooks 82, 84 (see FIG. 3B) engage the bottom face 58 of the shoulder 54 at step 214, see FIG. 3C.

At step 216, while the device 12 is in an assembled state, the cover 24 is secured onto the base 16 by the engagement of the body portion 60 of the cover 24 with the retainer 40 and by engagement of the detent 80 of the cover 24 with the shoulder 54, thereby securing the battery 14 within the device 12. While in the assembled state, the positive side of the battery 14 contacts the one or more electrical contacts 44 and the negative side of the battery 14 contacts the spring 32, so that electric current can pass between the working components of the equipment 10 and battery 14 during use of the equipment 10.

With reference now to FIG. 10, a battery removal process 300 for removing a battery from a device of an electronic equipment will now be described. The process 300 will be described with reference to the exemplary equipment 10 depicted in FIGS. 4A-4C. It is understood that the process 300 could also be used to install a battery into the exemplary equipment 110 of FIGS. 8A-8C or other electronic equipment having similar battery retaining devices. The steps described herein may be performed by a user, which may be a person or machine.

At step 302, the equipment 10 (see FIGS. 1 and 2) having the battery 14 secured in the device 12 (i.e., a battery retaining device) of the equipment 10 is provided, and the cap 26 is removed from the base 16 at step 304.

At step 306, a tool T is inserted into the slot 52 and is engaged with the fastener section 62 of the cover 24.

Figure 4A:
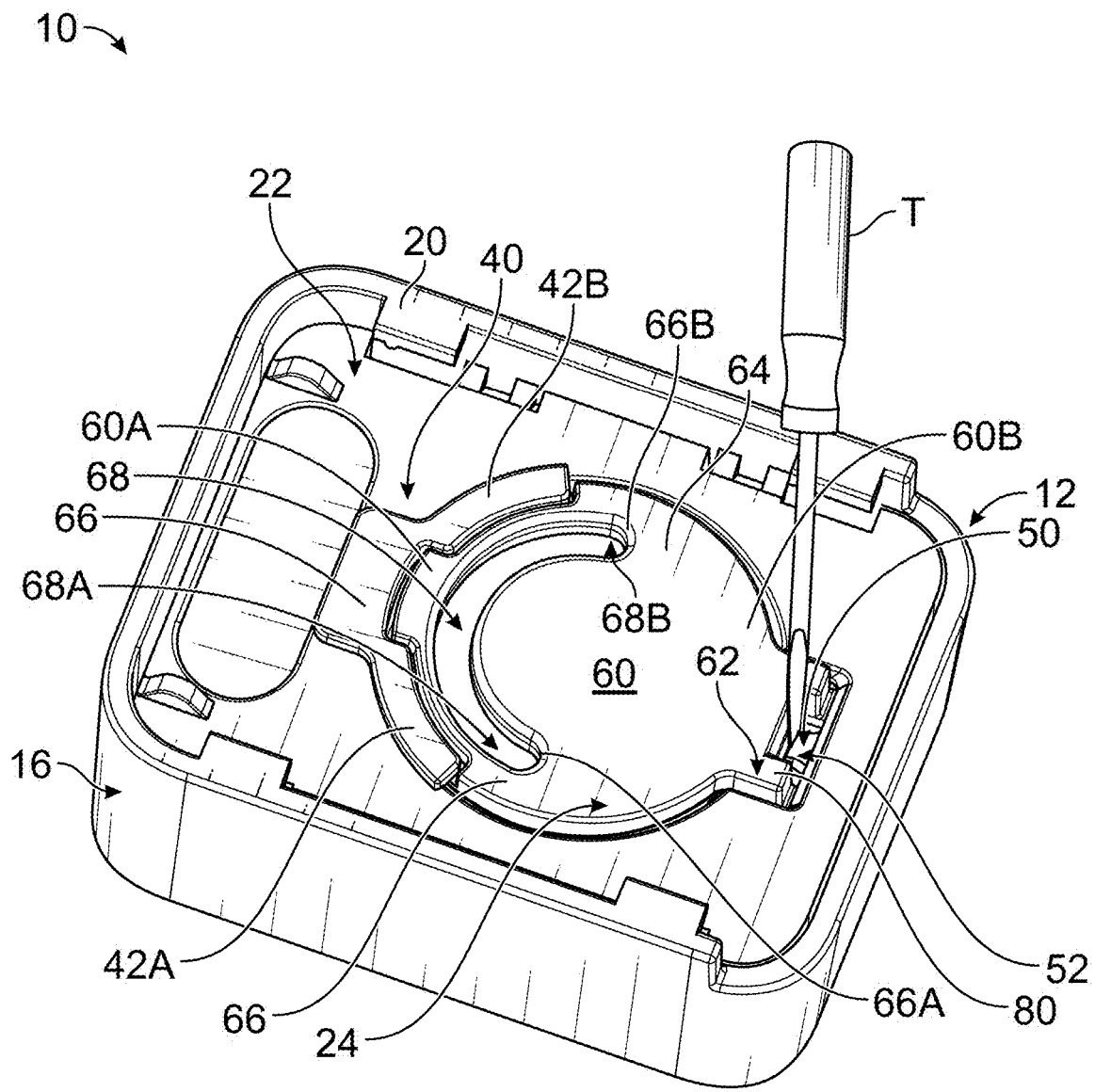
FIGS. 4A-4C are perspective views of the device shown in FIG. 1, illustrating a battery removal process in accordance with the present disclosure.

According to the illustrated embodiment, the tool T may be inserted between the two hooks 82, 84, see FIG. 4A.

Figure 4B:
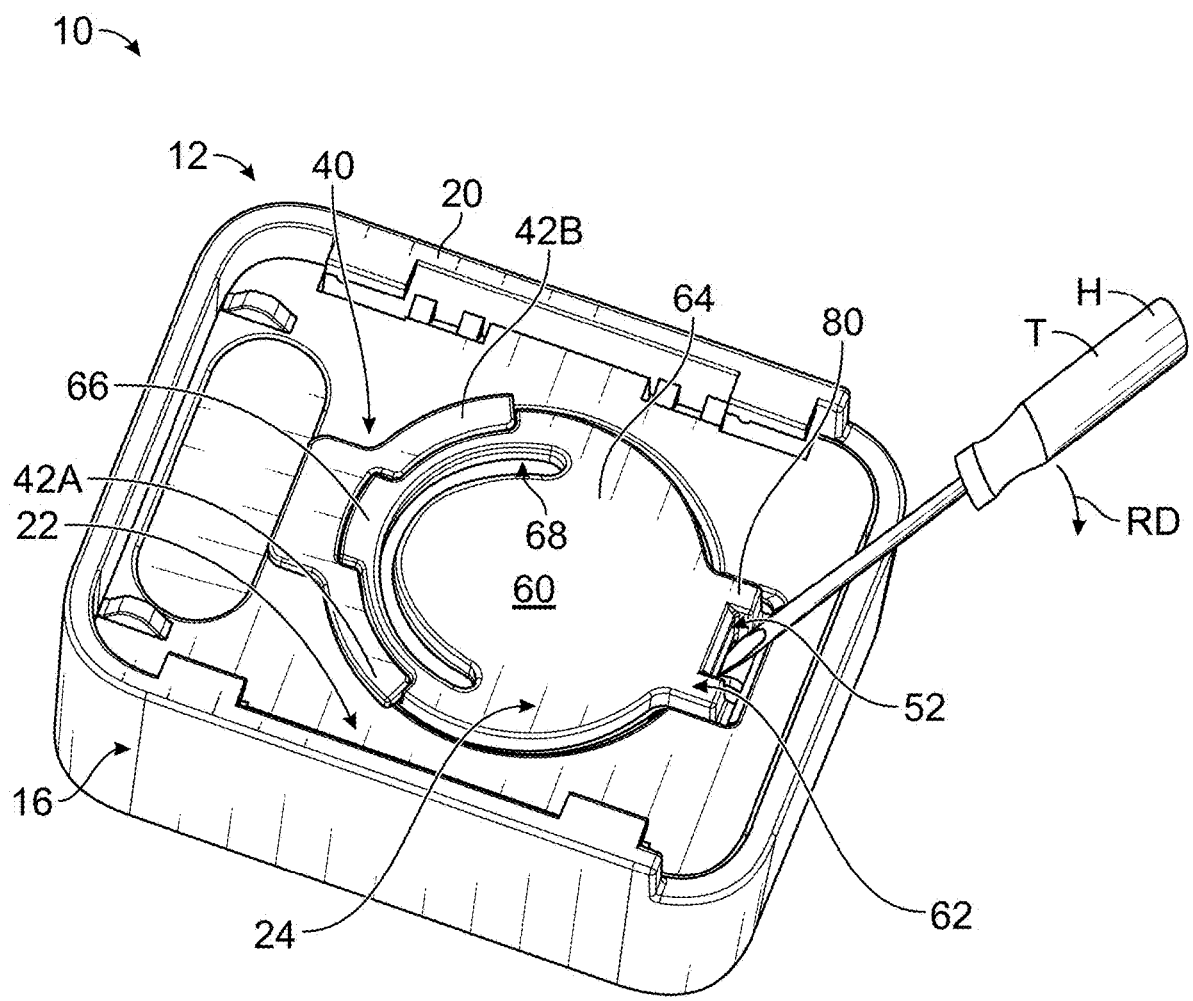
Figure 4C:
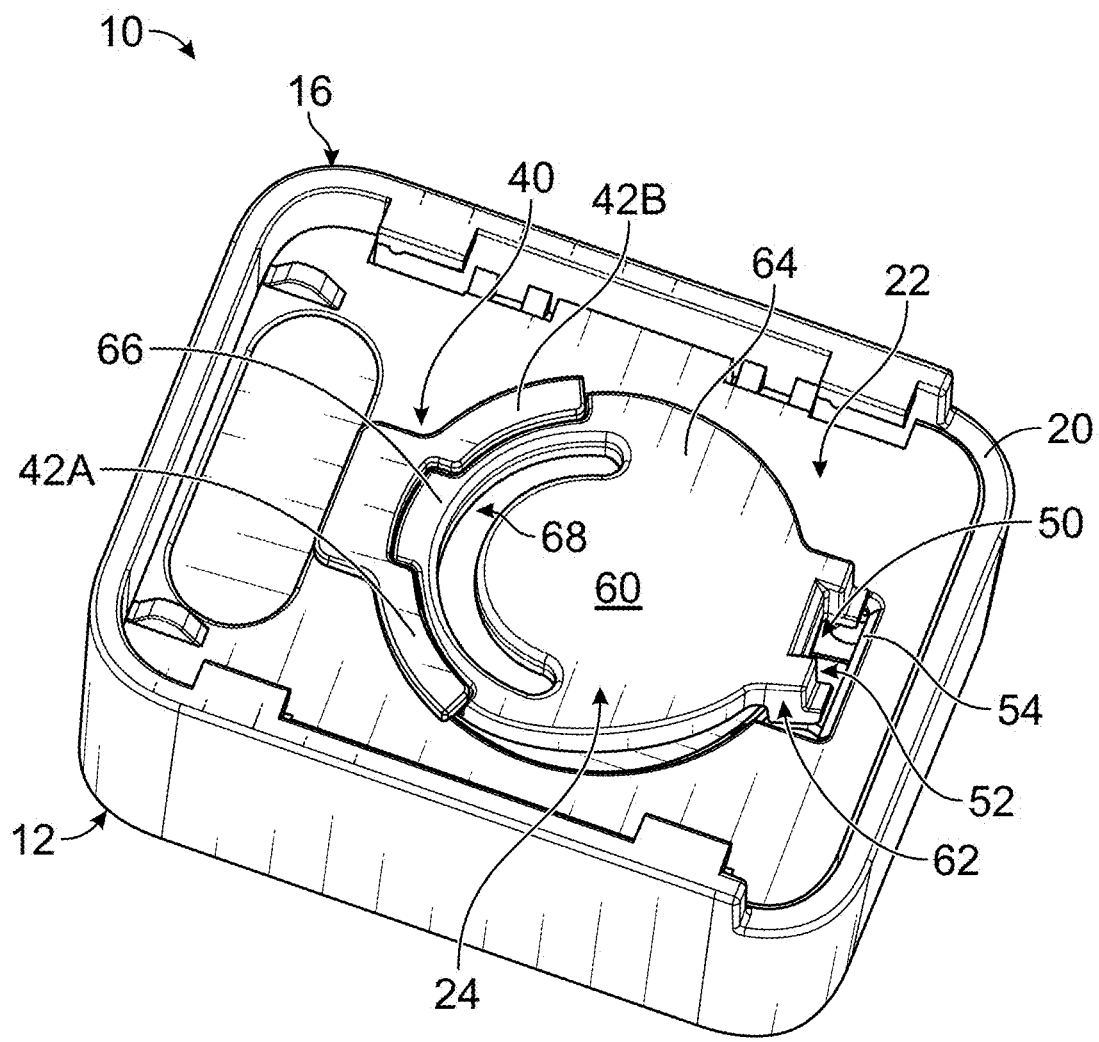
Figure 5:
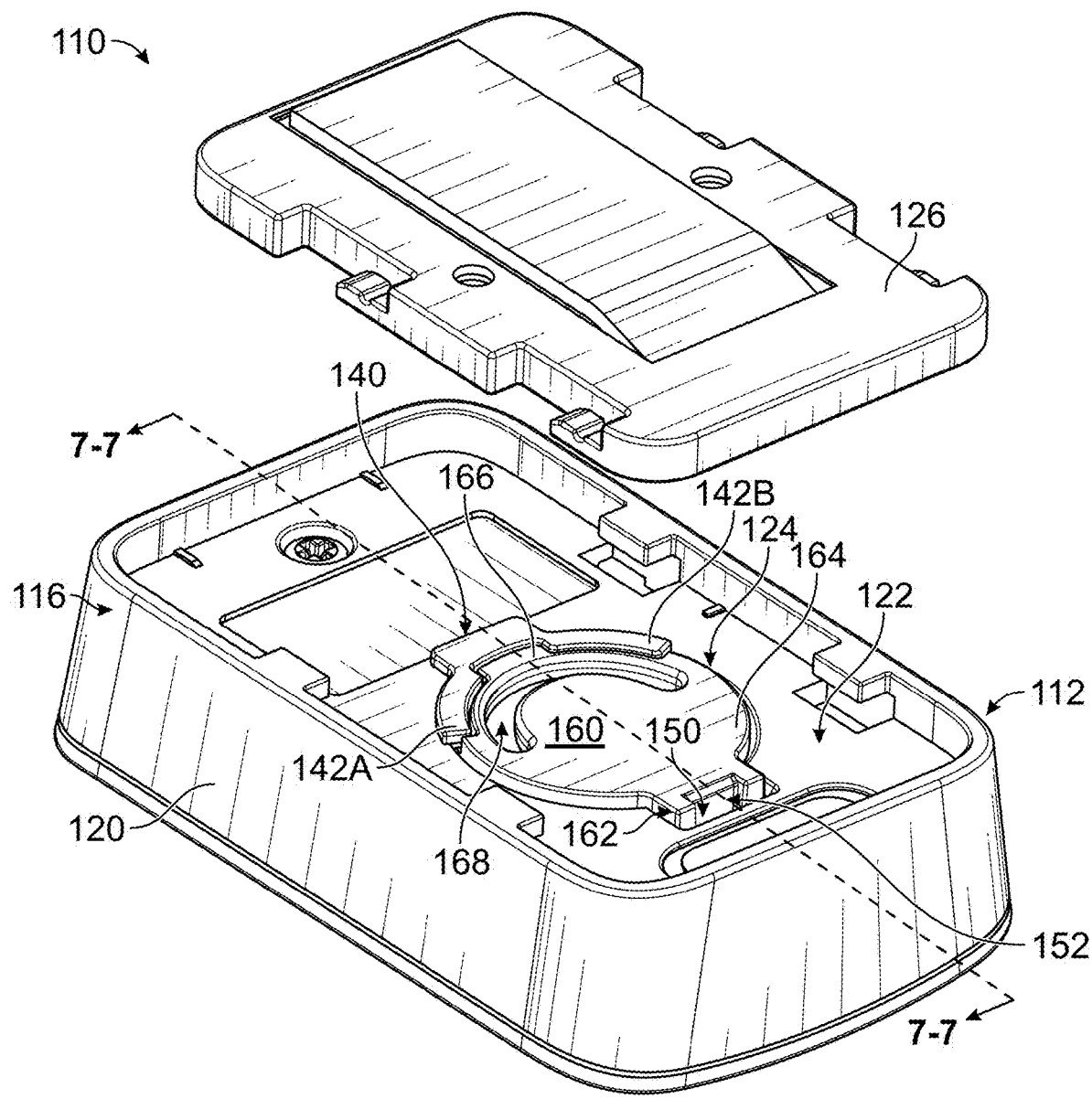
FIG. 5 is a perspective view of a device in accordance with the present disclosure.
Figure 6:
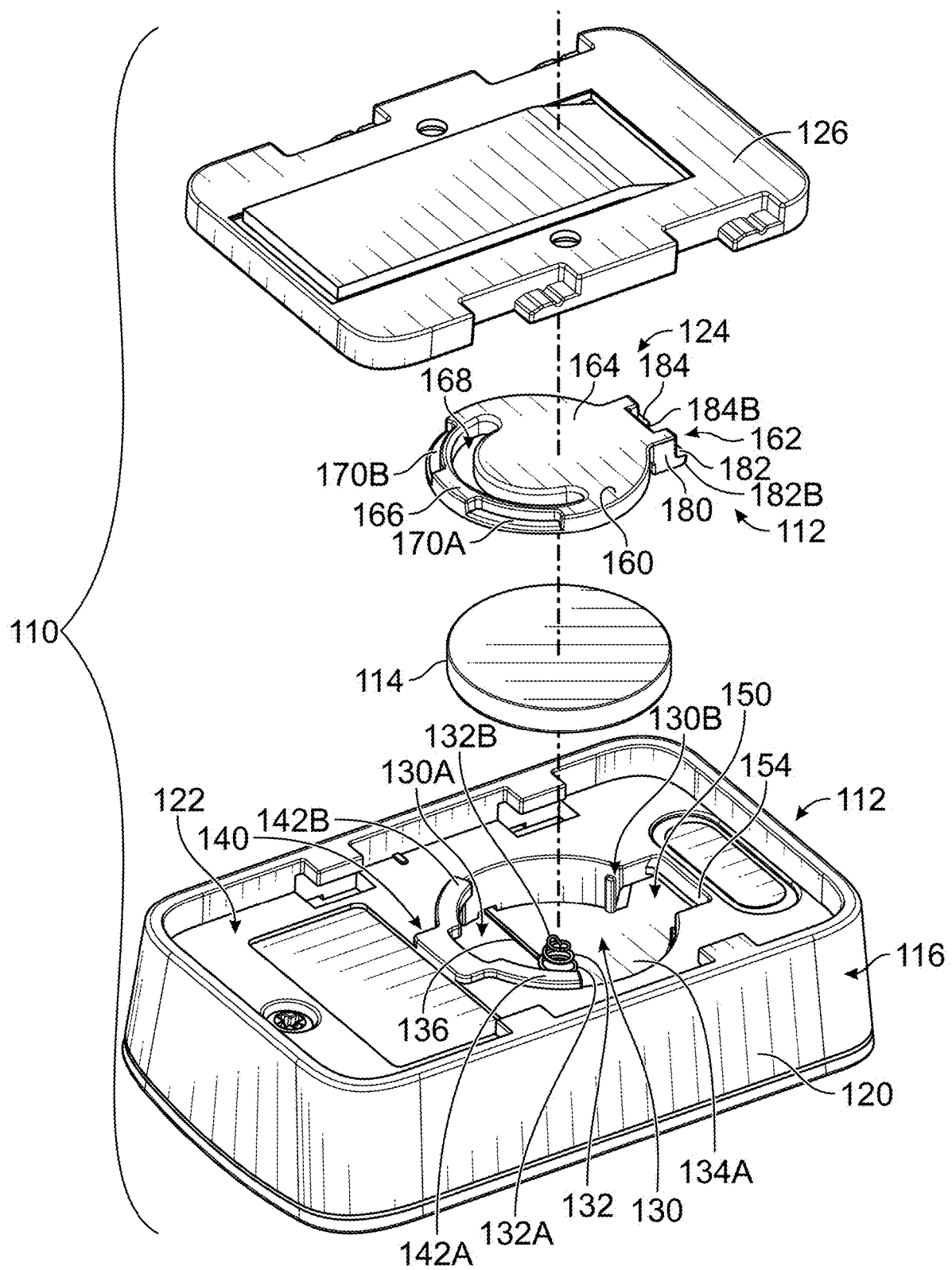
FIG. 6 is an exploded view of the device of FIG. 5.
Figure 7A:
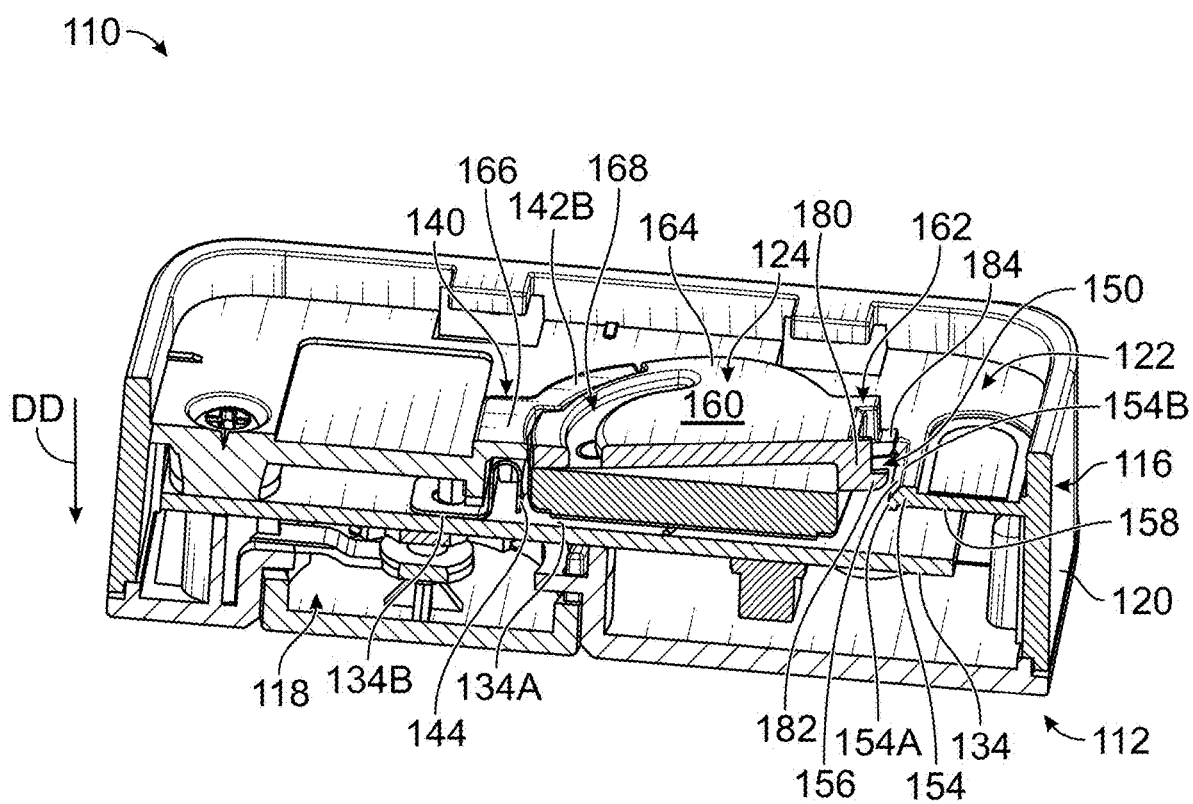
FIGS. 7A-7C are cross sectional views taken along line 7-7 in FIG. 5, illustrating an installation process in accordance with the present disclosure.
Figure 7B:
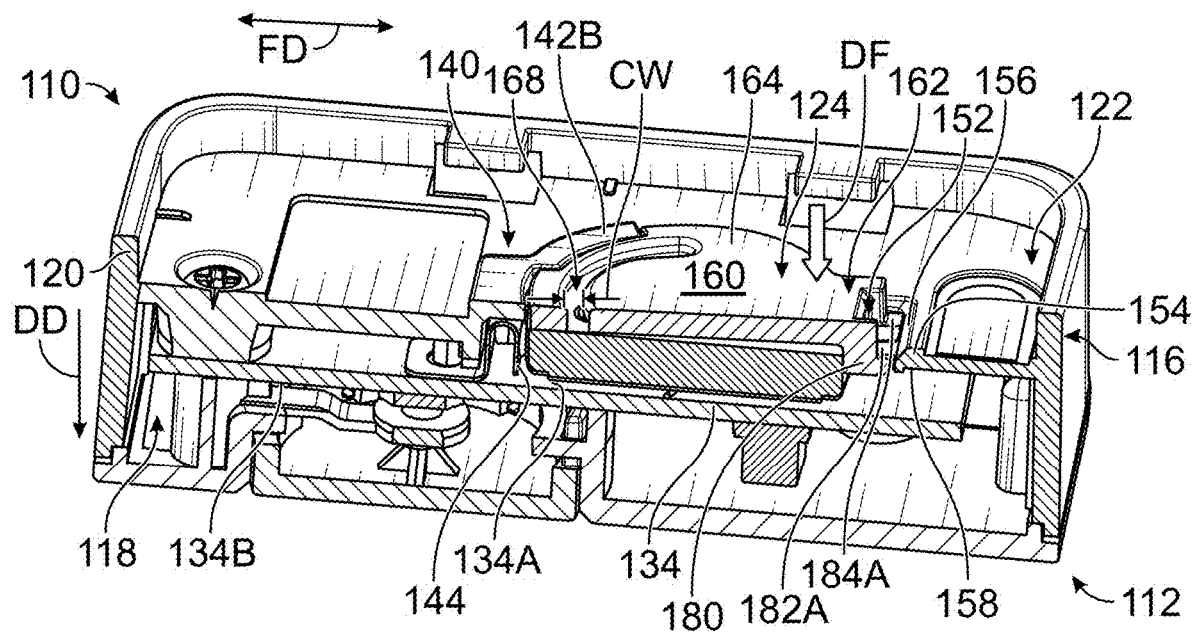
Figure 7C:
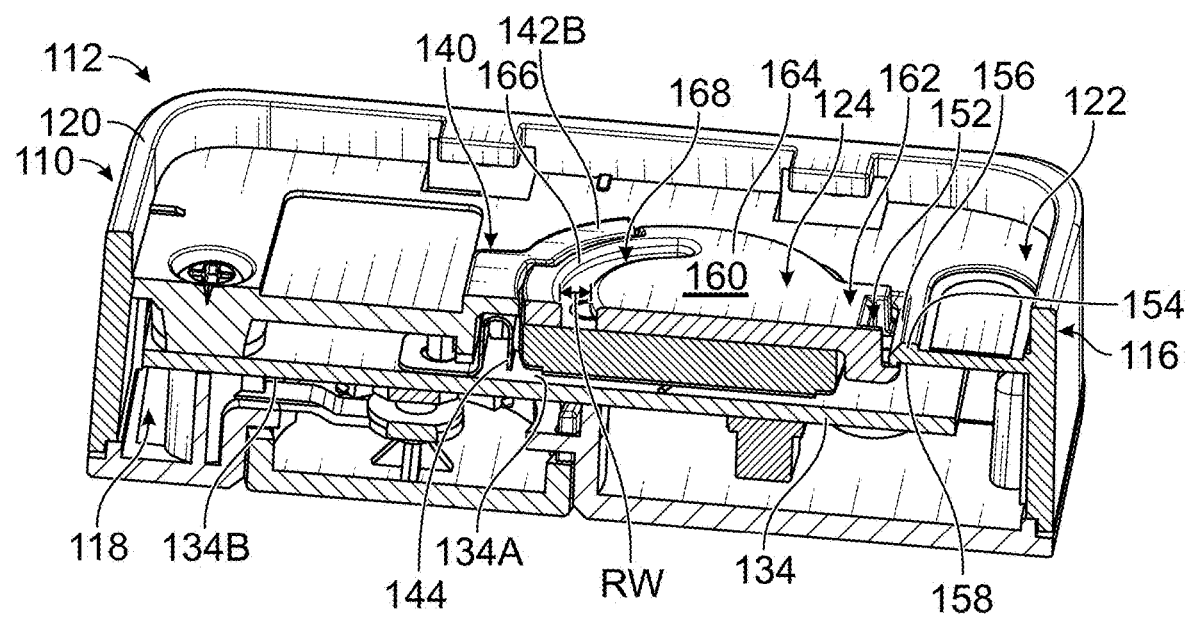
Figure 8A:
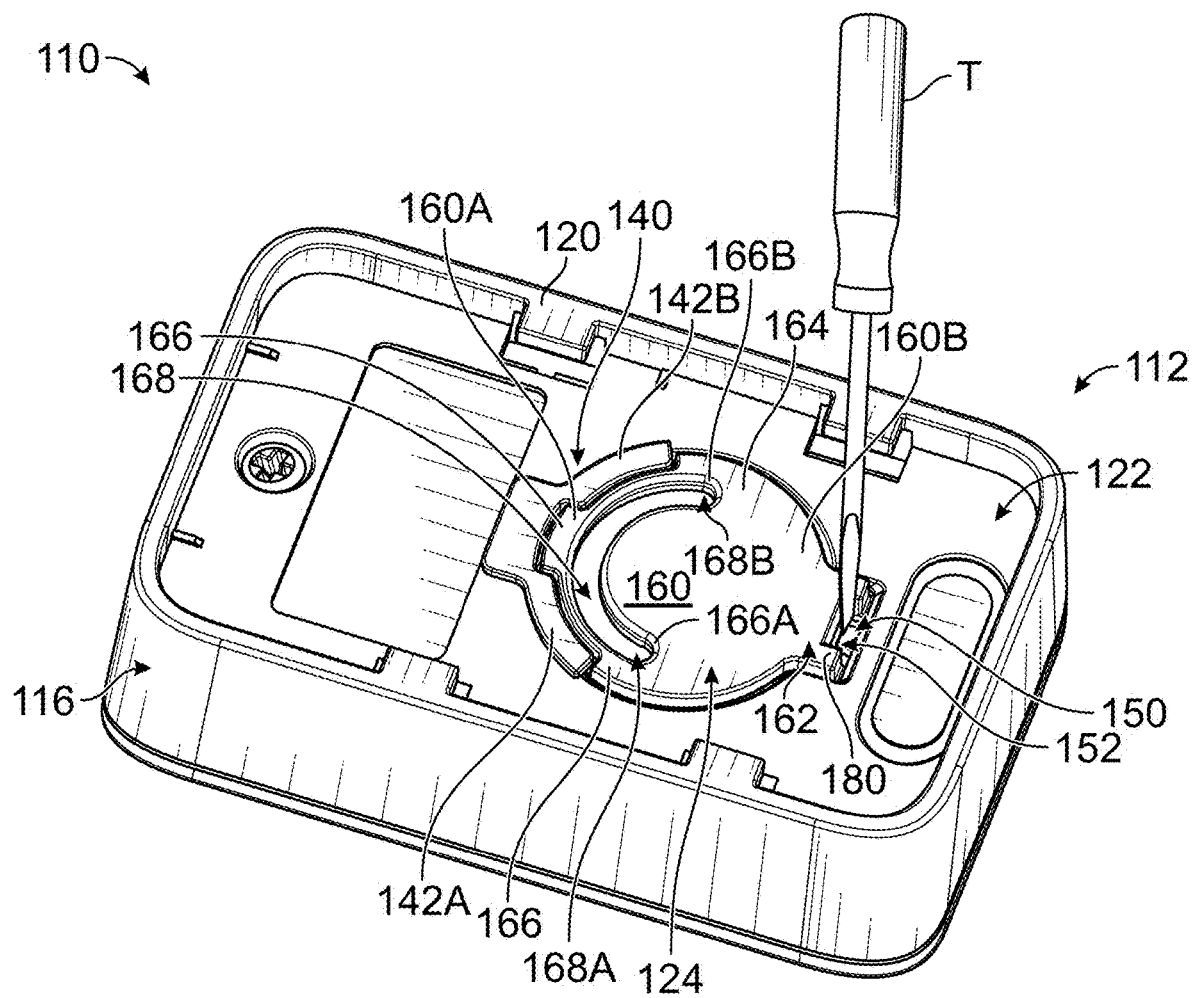
FIGS. 8A-8C are perspective views of the device shown in FIG. 5, illustrating a battery removal process in accordance with the present disclosure.
Figure 8B:
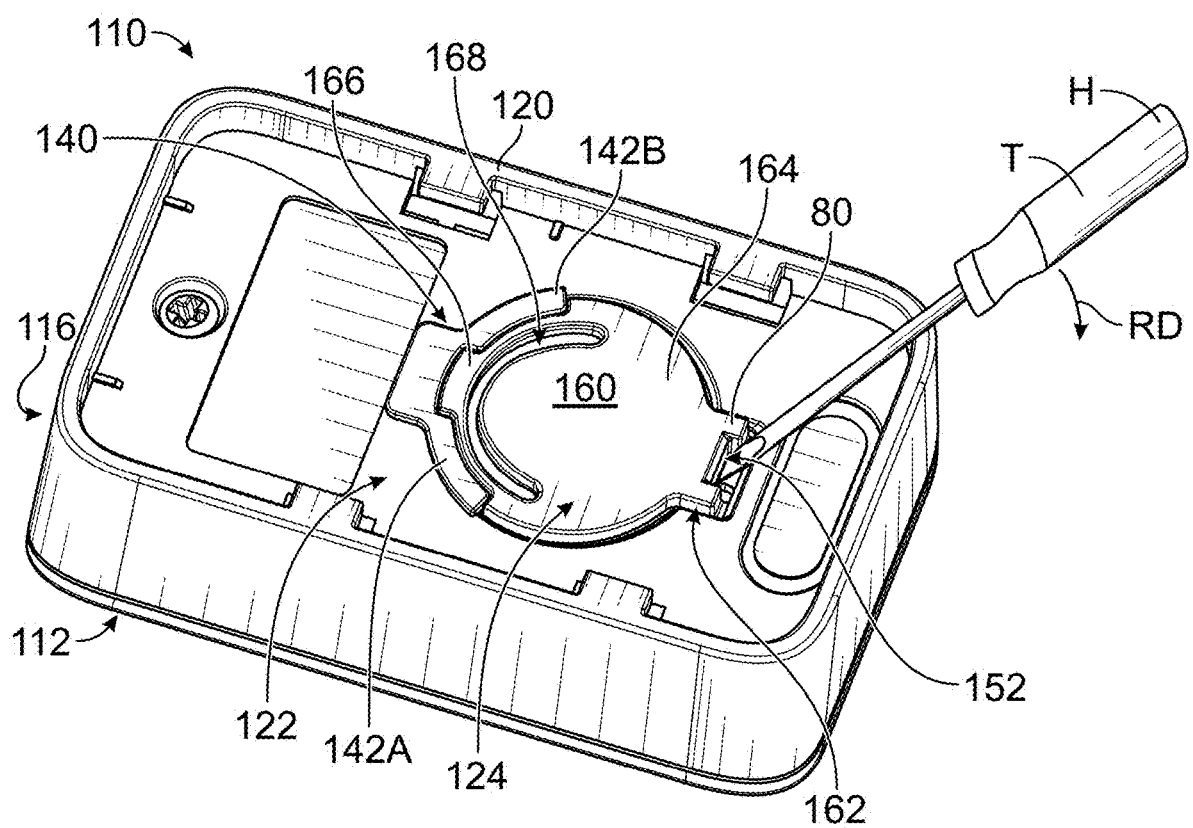
Figure 8C:
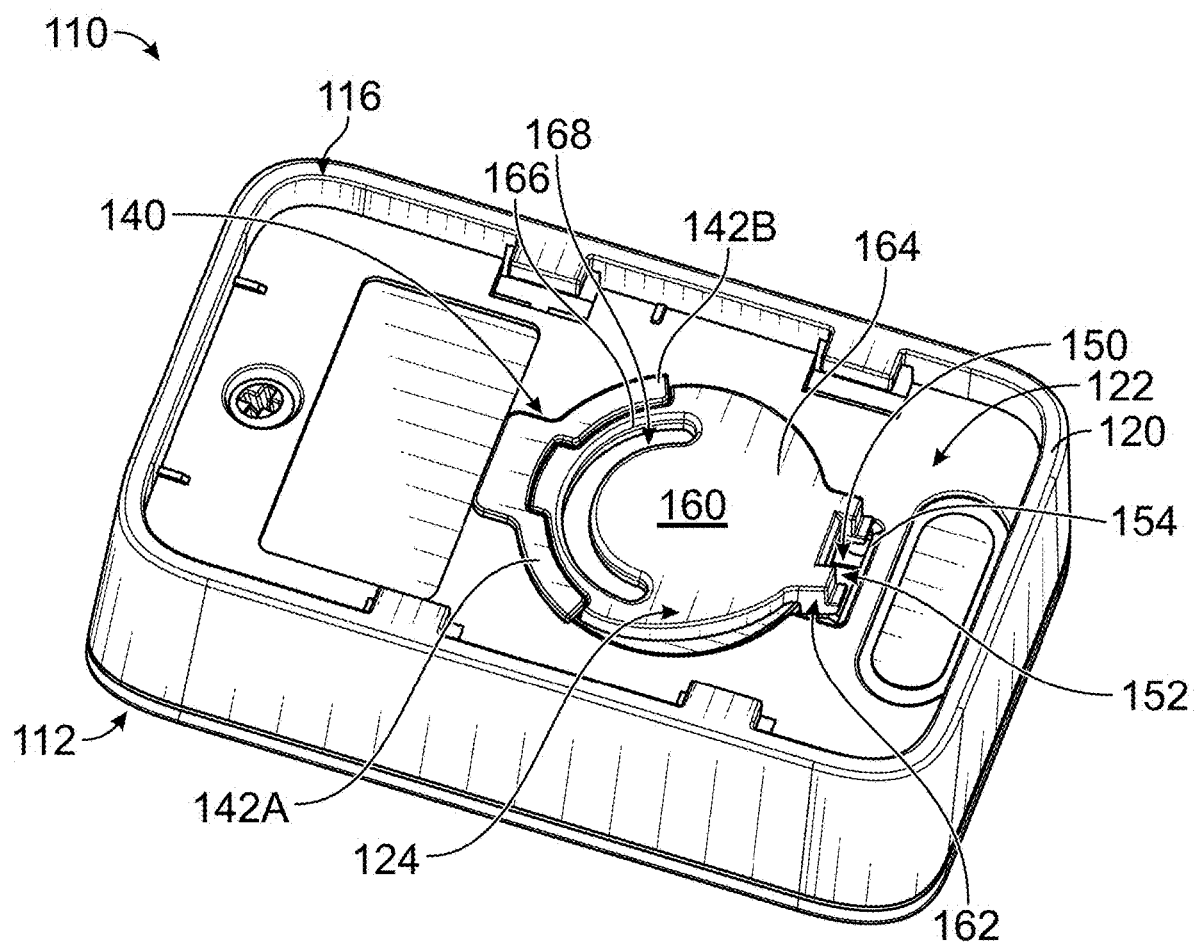

With reference to FIG. 4B, at step 308, a handle H of the tool T is rotated/pivoted in a removal direction RD, which applies a force onto the cover 24 to cause the upper surfaces 82A, 84A of the hooks 82, 84 (see FIG. 3B) to slide along the bottom face 58 of the shoulder 54 in the first direction FD. This movement causes the flexible cover 24 to flex and/or pivot at the first and second locations 66A, 66B at step 310 while the rim 66 of the cover 24 is restrained by the retainer 40, and thereby causing the size of the opening 68 in the cover 24 to decrease in the first direction FD, such that the opening 68 transitions from the relaxed width RW to the contracted width CW.

Once the detent 80 passes by the shoulder 54, and more specifically for the illustrated embodiment once upper surfaces 82A, 84A of the hooks 82, 84 (see FIG. 3B) overcome the bottom face 58 of the shoulder 54, continued rotation/pivoting of the handle H of the tool T in the removal direction RD at step 312 causes the fastener section 62 to lift away from the battery 14. That is, the detent 80 is released from the shoulder 54 in response to the force being applied by the tool T to the flexible cover 24, which force causes the flexible cover 24 to flex and/or pivot at the first and second locations 66A, 66B so as to disengage the detent 80 from the shoulder 54. Once the detent 80 is released from the shoulder 54, the opening 68 of the cover 24 transitions back to the relaxed width RW, see FIG. 4C.

Once the fastener section 62 is lifted away from the battery 14 and the detent 80 is disengaged from the shoulder 54, the cover 24 can be lifted out of the battery opening 30 at step 314 to allow access to the battery 14, followed by the battery 14 being removed from the battery opening 30 at step 316 to complete the battery removal process.

According to an embodiment, select ones of the coupling features that removably couple the cover to the battery plate may be reversed. For example, the detent may be provided on the battery plate with the shoulder being provided on the cover. According to such an embodiment, during a battery installation process, once the battery is installed in the battery opening and while the body portion of the cover is restrained by the retainer, the cover would be pushed down into the battery opening such that the shoulder on the cover moves past the detent on the battery plate. At that point, the built up force in the cover caused by its flexing at the first and second locations (as described above) causes the shoulder to move in the first direction away from the retainer such that the shoulder moves under the detent to removably couple the cover to the battery plate and secure the battery within the device. A battery removal process according to such an embodiment would involve using the tool to release the shoulder from the detent rather than using the tool to release the detent from the shoulder as described above for FIG. 10.

Various concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

CLAUSES

A. A device comprising:
  a base defining a battery opening in which to receive a battery, the base including a retainer located proximate to the battery opening, and the battery having a form factor of a coin-cell; and
  a depressible cover disposed in the battery opening and secured in place against the retainer to prevent removal of the battery from the base while the cover is coupled to the base, the cover including a detent and a body portion, wherein the cover is releasably secured to the base upon engagement of the body portion with the retainer and engagement of the detent with a shoulder of the base.
B. The device as set out in clause 1, wherein:
  the body portion of the depressible cover comprises a main section, a rim, and an opening extending between the main section and the rim;
  the rim is coupled to the main section at spaced apart locations near ends of the opening of the cover; and
  when a force is applied to the depressible cover, the cover and the battery are displaced in a downward direction.
C. The device as set out in clause A or B, wherein during installation of the depressible cover onto the base, the cover flexes to allow the detent to pass by the shoulder while the body portion of the cover is restrained by the retainer.
D. A device comprising:
  a base and a cover, the base defining a battery opening through which a battery is adapted to pass to be received in the device, the cover being releasably fastened to the base to prevent the battery from exiting through the battery opening while the cover is coupled to the base;
  the base comprising:
    a shoulder located proximate to the battery opening; and
    a retainer located proximate to the battery opening opposite the shoulder;
  the cover comprising:
    a body portion comprising a main section and a rim; and
    a fastener section extending from the body portion and including a detent;
  wherein, while the device is in an assembled state, the detent engages the shoulder while the rim engages the retainer.
E. The device as set out in clause D, wherein the base includes a housing and a battery plate, the battery plate defining the battery opening and including the shoulder and the retainer.
F. The device as set out in clause D or E, wherein the battery plate is integral with the housing of the base.
G. The device as set out in clause D or E, wherein the battery plate is formed separately from and attached to the housing of the base.
H. The device as set out in any one of clauses D-G, wherein at least one of the cover or the base defines a slot for receiving a tool to apply a force against the cover to release the detent from engagement with the shoulder.
I. The device as set out in clause H, wherein the slot is defined in the cover in or near the fastener section such that when the tool is inserted into the slot and applies the force onto the cover, the cover flexes to allow the detent to pass by the shoulder while the rim of the cover is restrained by the retainer.
J. The device as set out in clause H or I, wherein:
  the body portion of the cover further includes an opening extending between the main section and the rim;
  the rim of the cover is coupled to the main section at spaced apart locations near ends of the opening in the cover; and
  when the force is applied to the cover by the tool, the cover flexes at or near the locations where the rim is coupled to the main section.
K. The device as set out in any one of clauses D-J, wherein the detent comprises at least one of a hook, a spring-biased ball plunger, or a latch.
L. The device as set out in any one of clauses D-K, wherein the retainer of the base comprises a retaining extension and the rim of the cover comprises a retainment recess for receiving the retaining extension.
M. A device comprising:
  a base and a flexible cover, the base defining a battery opening through which a battery is adapted to pass to be received in the device, the cover being releasably fastened to the base to prevent the battery from exiting through the battery opening while the cover is coupled to the base; the base comprising:
    a shoulder located proximate to the battery opening; and
  the flexible cover comprising:
    a body portion; and
    a fastener section extending from the body portion and including a detent;

wherein, while the flexible cover is installed within the base, the detent engages the shoulder, the detent releasing from the shoulder in response to a force being applied to the flexible cover causing the flexible cover to flex so as to disengage the detent from the shoulder.

N. The device as set out in clause M, wherein at least one of the cover or the base defines a slot for receiving a tool to apply the force against the flexible cover to release the detent from engagement with the shoulder.

O. The device as set out in clause N, wherein the slot is defined in the cover in or near the fastener section such that when the tool is inserted into the slot and applies the force onto the flexible cover, the flexible cover flexes to release the detent from the shoulder.

P. The device as set out in clause N or O, wherein:
 the body portion of the flexible cover comprises a main section, a rim, and an opening extending between the main section and the rim;
 the rim is coupled to the main section at spaced apart locations near ends of the opening of the flexible cover; and
 when the force is applied to the flexible cover by the tool, the cover flexes at or near the locations where the rim is coupled to the main section.

Q. The device as set out in any one of clauses M-P, wherein:
 the detent comprises at least one of a hook, a spring-biased ball plunger, or a latch.

R. The device as set out in any one of clauses M-Q, wherein the base further comprises a retainer located proximate to the battery opening opposite the shoulder and, while the flexible cover is installed within the base, the body portion of the cover engages the retainer.

S. The device as set out in clause R, wherein the retainer of the base comprises a retaining extension and the body portion of the cover comprises a retainment recess for receiving the retaining extension.

T. A process for installing a battery in a device comprising:
 providing a device comprising a base and a cover, the base comprising a battery opening, a shoulder located proximate to the battery opening, and a retainer located proximate to the battery opening opposite the shoulder, the cover comprising a body portion and a detent extending from the body portion;
 inserting a battery through the battery opening in the base;
 positioning the body portion of the cover between the battery and the retainer; and
 securing the cover onto the base by engagement of the detent with the shoulder of the base.

U. The process as set out in clause T, wherein the securing the cover onto the base by engagement of the detent with the shoulder of the base includes causing the cover to flex while securing the cover onto the base by engagement of the detent with the shoulder of the base.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A device comprising:
 a base defining a battery opening in which to receive a battery, the base including a retainer located proximate to the battery opening, and the battery having a form factor of a coin-cell;
 a cover disposed in the battery opening and secured in place against the retainer to prevent removal of the battery from the base while the cover is coupled to the base, the cover including a detent and a body portion, wherein the cover is depressible so as to be releasably secured to the base upon engagement of the body portion with the retainer and engagement of the detent with a shoulder of the base; and
 a cap removably coupled to the base over the cover.

2. The device as set out in claim 1, wherein:
 the body portion of the cover comprises a main section, a rim, and an opening extending between the main section and the rim;
 the rim is coupled to the main section at spaced apart locations near ends of the opening of the cover; and
 when a force is applied to the cover, the cover and the battery are displaced in a downward direction.

3. The device as set out in claim 1, wherein during installation of the cover onto the base, the cover flexes to allow the detent to pass by the shoulder while the body portion of the cover is restrained by the retainer.

4. The device of claim 1, wherein at least one of the battery opening or the cover has a shape generally corresponding to a shape of the battery.

5. A device comprising:
 a base and a cover, the base defining a battery opening through which a battery is adapted to pass to be received in the device, the cover being releasably fastened to the base to prevent the battery from exiting through the battery opening while the cover is coupled to the base;
 the base comprising:
  a shoulder located proximate to the battery opening; and
  a retainer located proximate to the battery opening opposite the shoulder;
 the cover comprising:
  a body portion comprising a main section and a rim; and
  a fastener section extending from the body portion and including a detent;
 wherein, while the device is in an assembled state, the detent engages the shoulder while the rim engages the retainer.

6. The device as set out in claim 5, wherein the base includes a housing and a battery plate, the battery plate defining the battery opening and including the shoulder and the retainer.

7. The device as set out in claim 6, wherein the battery plate is integral with the housing of the base.

8. The device as set out in claim 6, wherein the battery plate is formed separately from and attached to the housing of the base.

9. The device as set out in claim 5, wherein at least one of the cover or the base defines a slot for receiving a tool to apply a force against the cover to release the detent from engagement with the shoulder.

10. The device as set out in claim 9, wherein the slot is defined in the cover in or near the fastener section such that when the tool is inserted into the slot and applies the force onto the cover, the cover flexes to allow the detent to pass by the shoulder while the rim of the cover is restrained by the retainer.

11. The device as set out in claim 10, wherein:
 the body portion of the cover further includes an opening extending between the main section and the rim;
 the rim of the cover is coupled to the main section at spaced apart locations near ends of the opening in the cover; and when the force is applied to the cover by the tool, the cover flexes at or near the locations where the rim is coupled to the main section.

12. The device as set out in claim 5, wherein the detent comprises at least one of a hook, a spring-biased ball plunger, or a latch.

13. The device as set out in claim 5, wherein the retainer of the base comprises a retaining extension and the rim of the cover comprises a retainment recess for receiving the retaining extension.

14. The device of claim 5, wherein the detent is on an opposite side of the cover from the rim.

15. A device comprising:
   a base and a flexible cover, the base defining a battery opening through which a battery is adapted to pass to be received in the device, the cover being releasably fastened to the base to prevent the battery from exiting through the battery opening while the cover is coupled to the base;
   the base comprising:
      a shoulder located proximate to the battery opening; and
   the flexible cover comprising:
      a body portion; and
      a fastener section extending from the body portion and including a detent;
   wherein, while the flexible cover is installed within the base, the detent engages the shoulder, the detent releasing from the shoulder in response to a force being applied to the flexible cover causing the flexible cover to flex so as to disengage the detent from the shoulder.

16. The device as set out in claim 15, wherein at least one of the cover or the base defines a slot for receiving a tool to apply the force against the flexible cover to release the detent from engagement with the shoulder.

17. The device as set out in claim 16, wherein the slot is defined in the cover in or near the fastener section such that when the tool is inserted into the slot and applies the force onto the flexible cover, the flexible cover flexes to release the detent from the shoulder.

18. The device as set out in claim 17, wherein:
   the body portion of the flexible cover comprises a main section, a rim, and an opening extending between the main section and the rim;
   the rim is coupled to the main section at spaced apart locations near ends of the opening of the flexible cover; and
   when the force is applied to the flexible cover by the tool, the cover flexes at or near the locations where the rim is coupled to the main section.

19. The device as set out in claim 15, wherein:
   the detent comprises at least one of a hook, a spring-biased ball plunger, or a latch.

20. The device as set out in claim 15, wherein the base further comprises a retainer located proximate to the battery opening opposite the shoulder and, while the flexible cover is installed within the base, the body portion of the cover engages the retainer.

21. The device as set out in claim 20, wherein the retainer of the base comprises a retaining extension and the body portion of the cover comprises a retainment recess for receiving the retaining extension.

22. A process for installing a battery in a device comprising:
   providing a device comprising a base and a cover, the base comprising a battery opening, a shoulder located proximate to the battery opening, and a retainer located proximate to the battery opening opposite the shoulder, the cover comprising a body portion and a detent extending from the body portion;
   inserting a battery through the battery opening in the base;
   positioning the body portion of the cover between the battery and the retainer;
   inserting the cover into the battery opening in the base;
   securing the cover onto the base by engagement of the detent with the shoulder of the base; and
   removably coupling a cap to the base over the cover.

23. The process as set out in claim 22, wherein the securing the cover onto the base by engagement of the detent with the shoulder of the base includes causing the cover to flex while securing the cover onto the base by engagement of the detent with the shoulder of the base.

24. The process of claim 22, wherein inserting the cover into the battery opening in the base causes the cover to flex at spaced apart locations near ends of an opening in the cover between a main section of the cover and a rim of the cover.

25. The process of claim 22, wherein inserting the cover into the battery opening in the base includes applying a force to the cover such that the cover and the battery are displaced in a downward direction.

\* \* \* \* \*